(12) United States Patent
Kim et al.

(10) Patent No.: US 11,451,116 B2
(45) Date of Patent: Sep. 20, 2022

(54) MOTOR

(71) Applicant: LG INNOTEK CO., LTD., Seoul (KR)

(72) Inventors: Jae Young Kim, Seoul (KR); Kyung Sang Park, Seoul (KR); Young Hwan Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 69 days.

(21) Appl. No.: 16/958,411

(22) PCT Filed: Dec. 19, 2018

(86) PCT No.: PCT/KR2018/016183
§ 371 (c)(1),
(2) Date: Jun. 26, 2020

(87) PCT Pub. No.: WO2019/132389
PCT Pub. Date: Jul. 4, 2019

(65) Prior Publication Data
US 2021/0057967 A1  Feb. 25, 2021

(30) Foreign Application Priority Data

Dec. 27, 2017  (KR) .................. 10-2017-0181409
Oct. 11, 2018  (KR) .................. 10-2018-0121225

(51) Int. Cl.
*H02K 7/00* (2006.01)
*H02K 11/215* (2016.01)

(52) U.S. Cl.
CPC ........... *H02K 11/215* (2016.01); *H02K 7/003* (2013.01)

(58) Field of Classification Search
CPC .................. H02K 7/003; H02K 11/215

USPC ......................................................... 310/68 b
See application file for complete search history.

(56) References Cited

U.S. PATENT DOCUMENTS

| 8,552,675 B2 * | 10/2013 | Asahi ..................... H02K 29/08 |
| | | 318/400.39 |
| 2011/0181221 A1 | 7/2011 | Asahi et al. |
| 2017/0040874 A1 * | 2/2017 | Han ........................ G01D 11/30 |

FOREIGN PATENT DOCUMENTS

| DE | 10-2011-112822 | 3/2013 |
| DE | 10-2015-017076 | 9/2016 |
| DE | 102015002562 A1 * | 9/2016 ............... F16D 1/06 |
| EP | 3128656 | 2/2017 |
| JP | 2013-007731 | 1/2013 |

(Continued)

OTHER PUBLICATIONS

International Search Report (with English Translation) and Written Opinion dated Mar. 28, 2019 issued in Application No. PCT/KR2018/016183.

(Continued)

*Primary Examiner* — Terrance L Kenerly
(74) *Attorney, Agent, or Firm* — KED & Associates, LLP

(57) ABSTRACT

An embodiment relates to a motor including a shaft, a rotor coupled to the shaft, a stator disposed outside the rotor, a sensing magnet disposed on the shaft, and a coupling member disposed to cover the sensing magnet, wherein the coupling member is inserted into a first groove concavely formed in an end portion of the shaft. Accordingly, combinability and assemblability of the sensing magnet and the shaft can be secured using the coupling member formed to have an elastic structure in the motor.

16 Claims, 18 Drawing Sheets

(56) References Cited

FOREIGN PATENT DOCUMENTS

| KR | 10-2010-0098171 | 9/2010 |
| KR | 10-2015-0020647 | 2/2015 |
| KR | 10-2017-0017127 | 2/2017 |
| KR | 10-1764848 | 8/2017 |

OTHER PUBLICATIONS

European Search Report dated Sep. 10, 2021 issued in Application No. 18896161.9.

* cited by examiner

MOTOR

CROSS-REFERENCE TO RELATED PATENT APPLICATIONS

This application is a U.S. National Stage Application under 35 U.S.C. P71 of PCT Application No. PCT/KR2018/016183, filed Dec. 19, 2018, which claims priority to Korean Patent Application Nos. 10-2017-0181409, filed Dec. 27, 2017, and 10-2018-0121225, filed Oct. 11, 2018, whose entire disclosures are hereby incorporated by reference.

TECHNICAL FIELD

The present invention relates to a motor.

BACKGROUND ART

Motors are apparatus configured to convert electrical energy to mechanical energy to obtain rotational forces and are widely used for vehicles, home appliances, industrial machines, and the like.

The motor may include a housing, a shaft, a stator disposed on an inner circumferential surface of the housing, and a rotor installed on an outer circumferential surface of the shaft. In this case, the stator of the motor electrically interacts with the rotor to cause the rotor to rotate.

A sensing magnet may be disposed in an end portion of the shaft. In this case, the sensing magnet may be fixed to the shaft using an adhesive and the like.

However, in a case in which the sensing magnet is fixed to the shaft using the adhesive, it is difficult to accurately manage an adhesion process and there is a possibility for the sensing magnet to be separated from the shaft. In addition, in a case in which the shaft is formed of a magnetic material, since the sensing magnet is attached to the end portion of the shaft, there is problem in that an amount of magnetic flux leaking from the sensing magnet to the shaft is increased.

In addition, although there is a method of fixing the sensing magnet into the shaft through a press fitting process, in the case in which the sensing magnet is coupled to the shaft using the press fitting method, chips may be generated. In addition, a short-circuit problem or the like may occur in the motor due to the chips.

In addition, the sensing magnet or the shaft may also be deformed when the sensing magnet is excessively press-fitted. In addition, conversely, in a case in which the sensing magnet is too loosely press-fitted thereto, slipping may also occur between the sensing magnet and the shaft.

Meanwhile, the sensing magnet may be coupled to an upper end of the shaft. In a case in which the sensing magnet is positioned at the upper end of the shaft as described above in an environment in which a space, in which the motor and an application are assembled, is limited, there is a problem in that an assembly space for assembling the sensing magnet to the shaft is very small.

Technical Problem

The present invention is directed to providing a motor in which a sensing magnet and a shaft may be coupled and assembled using a coupling member without an adhesion process using an adhesive or press fitting process.

In addition, the present invention is directed to providing a motor in which contamination or damage of a sensing magnet is prevented using a coupling member.

In addition, the present invention is directed to providing a motor in which position determinability of a sensing magnet is secured using an elastic member.

The present invention is also directed to providing a motor in which a sensing magnet is easily installed on an end of a shaft even in a small space.

Objectives that should be solved according to embodiments are not limited to the above described objectives, and other objectives which are not described above will be clearly understood by those skilled in the art from the following specification.

Technical Solution

One aspect of the present invention provides a motor including a shaft including an end in which a first groove is formed, a rotor and a sensing magnet which are coupled to the shaft, and a coupling member which couples the shaft and the sensing magnet, wherein the coupling member includes a coupling portion, which has an elastic force and of which at least a part is inserted into and coupled to the first groove, and an accommodation portion fixing the sensing magnet.

A plurality of coupling portions may be formed as the coupling portion of the coupling member on a lower end of the accommodation portion, and each of the plurality of coupling portions may include a first region formed to protrude downward from an end portion of the accommodation portion and a second region obliquely bent upward from a lower portion of the first region.

The coupling portion may further include a third region bent outward from an end portion of the second region, the shaft may include an inner circumferential surface and a lower surface which form the first groove, the shaft may include a second groove concavely formed in the inner circumferential surface, and an end portion of the third region may be disposed in the second groove.

The motor may further include an elastic member disposed under the sensing magnet, wherein the shaft may include a third groove concavely formed in the lower surface, and one lower region of the elastic member may be disposed in the third groove.

The coupling portion may be press-fitted into and coupled to the first groove, and the accommodation portion may be disposed on a side surface of the coupling portion.

The coupling member may include a body having a cylindrical shape, the accommodation portion may include an upper surface portion extending from an upper end of the body in a radius direction and a side surface portion extending downward from an edge of the upper surface portion, the sensing magnet may be formed to have a donut shape and may include a groove, and a part of the body may be disposed in the groove of the sensing magnet.

An outer circumferential surface of the body may be in contact with an inner circumferential surface of the sensing magnet, an inner surface of the upper surface portion may be in contact with an upper surface of the sensing magnet, and an inner surface of the side surface portion may be in contact with an outer circumferential surface of the sensing magnet.

The upper surface portion may include a plurality of bent portions, a height of the upper surface portion disposed between the bent portions may be less than a height of the upper surface portion disposed outside the bent portion, and the upper surface portion in contact with the upper surface of the sensing magnet may be formed between the bent portions.

The upper surface portion disposed outside the bent portion may be spaced apart from the upper surface of the sensing magnet so that an additional space may be formed.

The sensing magnet may include inclined surfaces, and the inclined surfaces may be disposed on a boundary between the upper surface and an inner circumferential surface of the sensing magnet and disposed on a boundary between a lower surface and the inner circumferential surface of the sensing magnet.

Advantageous Effects

In a motor having the above-described structure according to embodiments, combinability and assemblability of a sensing magnet and a shaft can be secured using a coupling member. For example, combinability and assemblability of the coupling member to the shaft can be secured and the sensing magnet can also be prevented from being separated from the shaft using a shape structure of the coupling member capable of applying an elastic force to the shaft.

In addition, contamination or damage of the sensing magnet can be prevented using the coupling member.

In addition, the sensing magnet can be positioned at a preset position using an elastic member or an adhesive member. For example, in a state in which the coupling member is coupled to the shaft, since the sensing magnet is pressed against the coupling member due to the elastic force of the elastic member, position determinability of the sensing magnet can be secured. In addition, since the sensing magnet is attached to the coupling member due to the adhesive member, position determinability of the sensing magnet can be secured.

According to the embodiments, even in a small space, an advantageous effect is provided in that the sensing magnet is easily installed on an end of the shaft.

Useful advantages and effects of the embodiments are not limited to the above-described contents and will be more easily understood from descriptions of the specific embodiments.

MODES OF THE INVENTION

Figure 1:
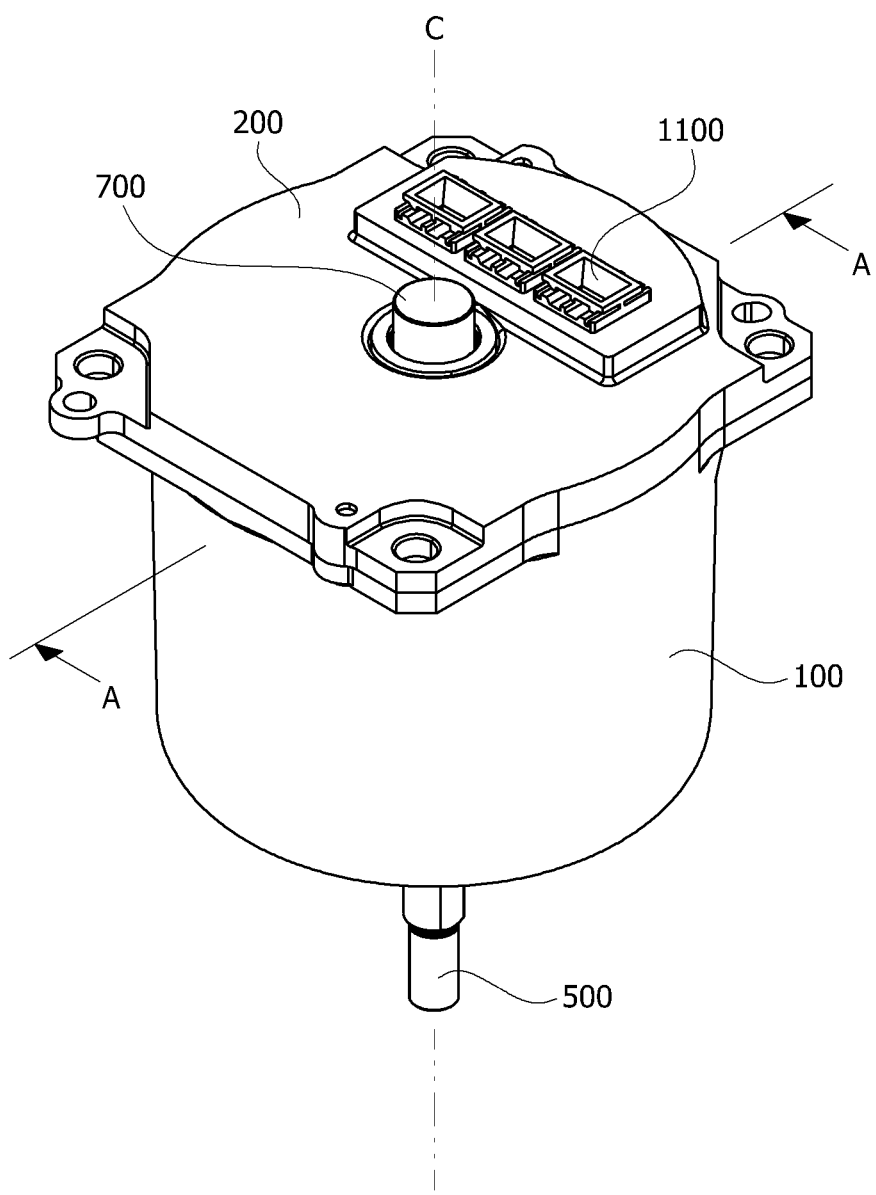
FIG. 1 is a perspective view illustrating a motor according to a first embodiment.

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both cases in which the two elements are formed or disposed in direct contact with each other and in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

Figure 2:
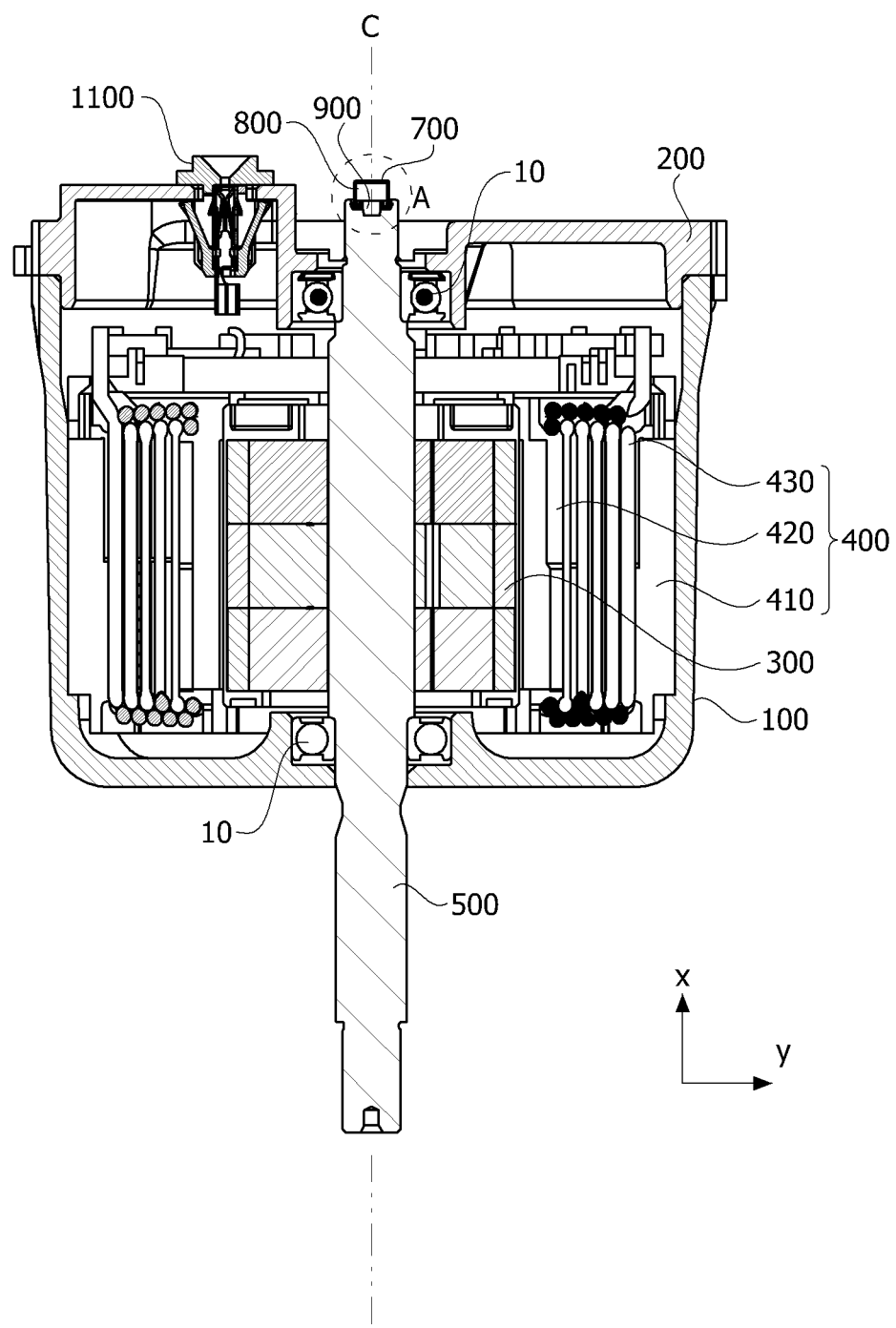
FIG. 2 is a cross-sectional view illustrating the motor according to the first embodiment.
Figure 3:
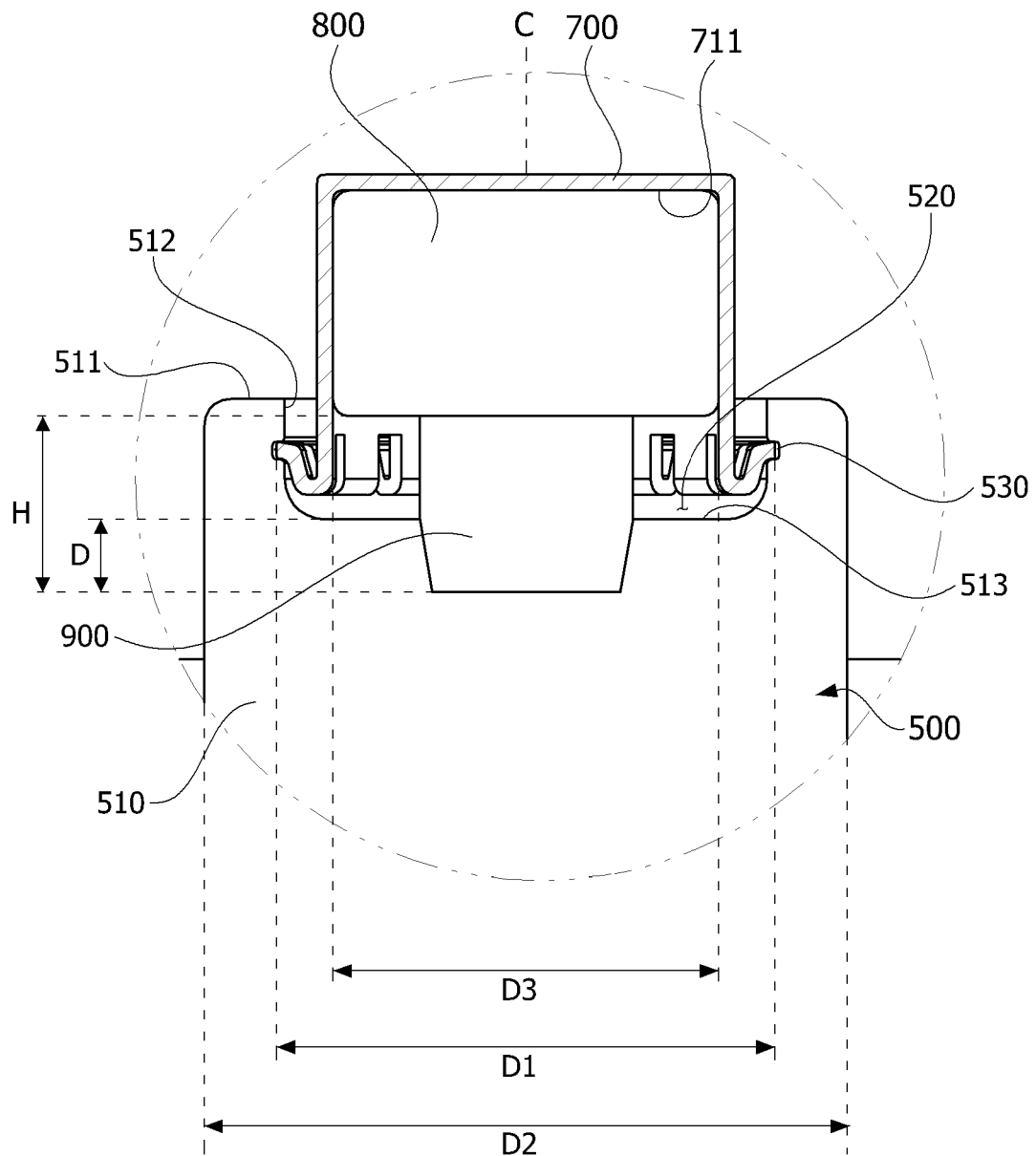
FIG. 3 is an enlarged view illustrating region A of FIG. 2.

FIG. 1 is a perspective view illustrating a motor according to a first embodiment, FIG. 2 is a cross-sectional view illustrating the motor according to the first embodiment, and FIG. 3 is an enlarged view illustrating a region A of FIG. 2.

FIG. 2 is a cross-sectional view taken along line A-A of FIG. 1, and an x direction is referred to as a shaft direction and a y direction is referred to as a radius direction in FIG. 2. In addition, the shaft direction is perpendicular to the radius direction. In this case, the shaft direction may be a longitudinal direction of the shaft 500.

Referring to FIGS. 1 to 3, a motor 1 according to the embodiment may include a housing 100 having an opening formed at one side thereof, a cover 200 disposed on the housing 100, a rotor 300 coupled to a shaft 500, a stator 400 disposed inside the housing 100, the shaft 500 rotated with the rotor 300, a bus bar 600 disposed on the stator 400, and a sensing assembly disposed on an end portion of the shaft 500. In this case, the sensing assembly may include a coupling member 700 and a sensing magnet 800 disposed in the coupling member 700. In addition, the motor 1 may further include an elastic member 900 disposed under the sensing magnet 800. In addition, the motor 1 may further include an adhesive member 1000 which fixes the sensing magnet 800 in the coupling member 700.

In the motor 1, since the coupling member 700 is disposed in a first groove 520 concavely formed in an upper end portion of the shaft 500 in the shaft direction, combinability and assemblability of the shaft 500 and the sensing magnet 800 may be secured. For example, since the coupling member 700 is formed to have a structure capable of applying an elastic force, combinability and assemblability of the first groove 520 of the shaft 500 can be secured. In addition, since the coupling member 700 is disposed to cover the sensing magnet 800, contamination, damage, and separation of the sensing magnet 800 may be prevented.

Meanwhile, the motor 1 may be used as a motor used in an electronic power steering (EPS) system. The EPS system may assist a steering force using a driving force of the motor to secure turning stability and provide a rapid restoring force of a vehicle. Accordingly, a driver of the vehicle can safely travel.

The housing 100 and the cover 200 may form an exterior of the motor 1. In addition, the housing 100 may be coupled to the cover 200 to form an accommodation space. Accordingly, as illustrated in FIG. 2, the rotor 300, the stator 400, the shaft 500, the bus bar 600, and the like may be disposed in the accommodation space. In this case, the shaft 500 is rotatably disposed in the accommodation space. Accordingly, the motor 1 may include bearings 10 disposed on an upper portion and a lower portion of the shaft 500. In this case, the bearings 10 may include a first bearing disposed on the upper portion of shaft 500 and a second bearing disposed on the lower portion of the shaft 500.

The housing 100 may be formed to have a cylindrical shape. In addition, the rotor 300, the stator 400, and the like may be accommodated in the housing 100. In this case, a shape or a material of the housing 100 may be variously changed. For example, the housing 100 may be formed of a metal material which firmly withstands even high temperatures.

The cover 200 may be disposed above the housing 100, that is, an upper portion of the housing 100, to cover the opening of the housing 100. In this case, holes in which connectors 1100 connected to an external power source are disposed may be formed in the cover 200. In addition, upper ends of the connectors 1100 may be exposed through the holes of the cover 200. In this case, one sides of the connectors 1100 are formed to have structures into which power pins are inserted, and the other sides thereof are formed to have structures connected to coils 430 of the stator 400. Accordingly, the external power pins are easily inserted into the connectors 1100 so that power may be supplied to the stator 400.

Meanwhile, a shape or a material of the cover 200 may be variously changed. For example, the cover 200 may be formed of a metal material which firmly withstands even high temperatures.

The rotor 300 is rotated due to an electrical interaction with the stator 400. In this case, the rotor 300 is disposed inside the stator 400. In addition, the shaft 500 may be coupled to a central portion of the rotor using a press fitting method. In this case, the "inside" may be referred to as a direction toward a center C and "outside" may be referred to as a direction opposite to the direction toward the center C when viewed from above.

A rotor core (not shown) may be coupled to magnets (not shown) to form the rotor 300. For example, the rotor 300 may be formed to have a type in which the magnets are disposed on an outer circumferential surface of the rotor core. Alternatively, the rotor 300 may also be formed to have a type in which the magnets are disposed in the rotor core. In this case, the magnets may be referred to as rotor magnets or drive magnets.

Accordingly, the magnets generate a rotating magnet field with the coils 430 wound around the stator 400. In this case, the magnets may be disposed such that N-poles and S-poles are alternately positioned in a circumferential direction about the shaft 500.

Accordingly, the rotor 300 is rotated due to an electrical interaction between the coils 430 and the magnets, and when the rotor 300 is rotated, the shaft 500 is rotated so that a driving force of the motor 1 is generated.

Meanwhile, a plurality of thin steel plates may be stacked to be provided as the rotor core of the rotor 300, or the rotor core may have one cylindrical shape. In this case, a hole to which the shaft 500 is coupled may be formed at a center of the rotor core.

The stator 400 may be disposed inside the housing 100. In this case, the stator 400 may be supported by an inner circumferential surface of the housing 100. In addition, the stator 400 is disposed outside the rotor 300. That is, the rotor 300 may be disposed inside the stator 400.

Referring to FIG. 2, the stator 400 may include a stator core 410, an insulator 420 disposed in the stator core 410, and the coils 430 wound around the insulator 420.

The coils 430 configured to generate a rotating magnetic field may be wound around the stator core 410. In this case, the stator core 410 may be formed of one core, or a plurality of divided cores may be coupled to each other to be formed as the stator core 410.

A plurality of thin steel plates may be stacked to be formed as the stator core 410, but the stator core 410 is not limited thereto. For example, the stator core 410 may also be formed as one single product.

The stator core 410 may include a yoke (not shown) having a cylindrical shape and a plurality of teeth (not shown) protruding from the yoke in the radius direction. In addition, the coils 430 may be wound around the teeth.

The insulator 420 insulates the stator core 410 from the coils 430. Accordingly, the insulator 420 may be disposed between the stator core 410 and the coils 430.

Accordingly, the coils 430 may be wound around the stator core 410 on which the insulator 420 is disposed.

Meanwhile, the rotor 300 may further include a can (not shown) disposed to cover the rotor core to which the magnets are attached.

The can may protect the rotor core and the magnets from external physical impact and chemical stimulation and prevent foreign materials from being introduced into the rotor core and the magnets.

In addition, the can prevents the magnets from being separated from the rotor core.

The shaft 500 may be disposed in the housing 100 to be rotatable due to the bearings. In addition, the shaft 500 may be rotated in conjunction with the rotation of the rotor 300.

The shaft 500 may be coupled to the rotor 300 and rotated in conjunction with the rotation of the rotor 300. In this case, the shaft 500 may be coupled to the rotor core using a press fitting method.

Figure 4:
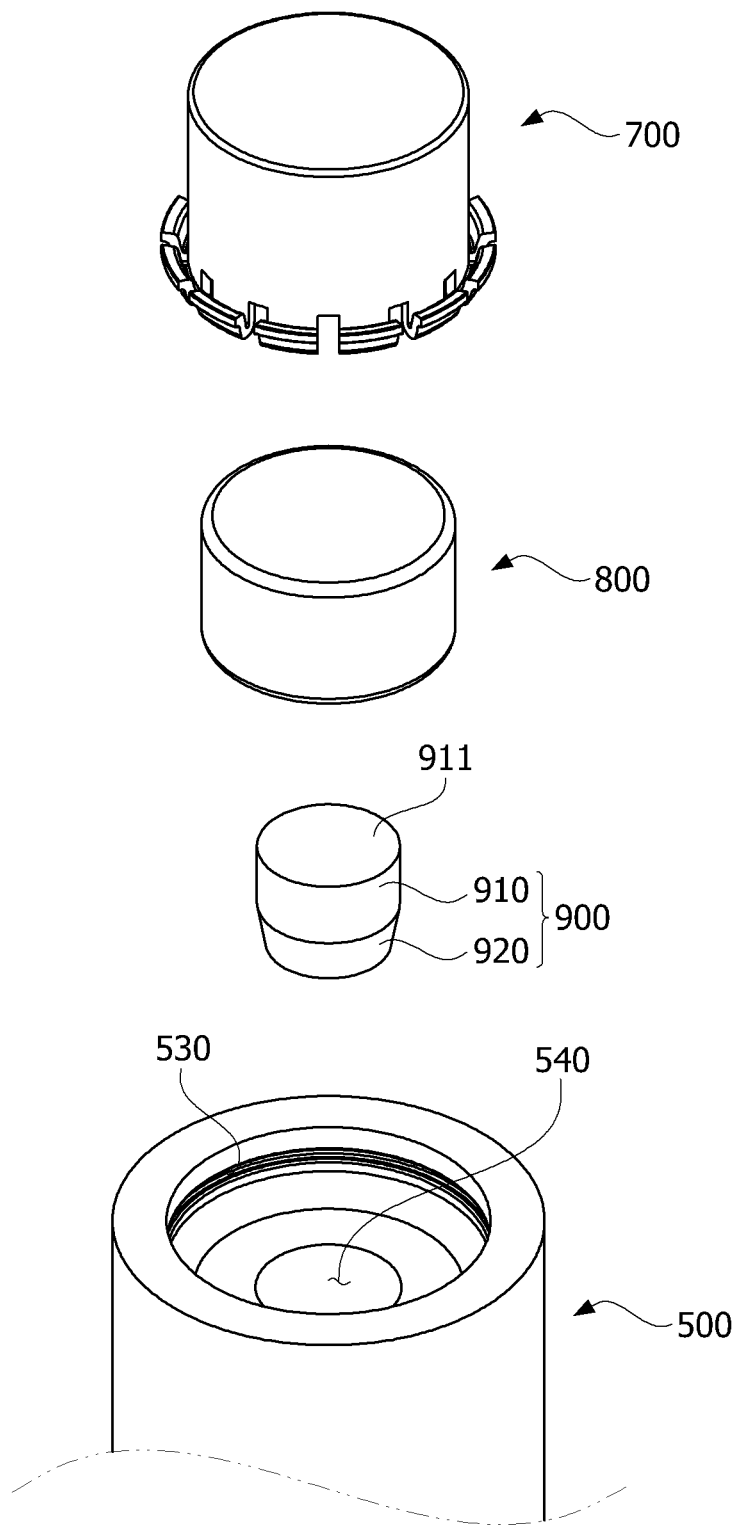
FIG. 4 is an exploded perspective view illustrating a sensing assembly disposed on a shaft of the motor according to the first embodiment.
Figure 5:
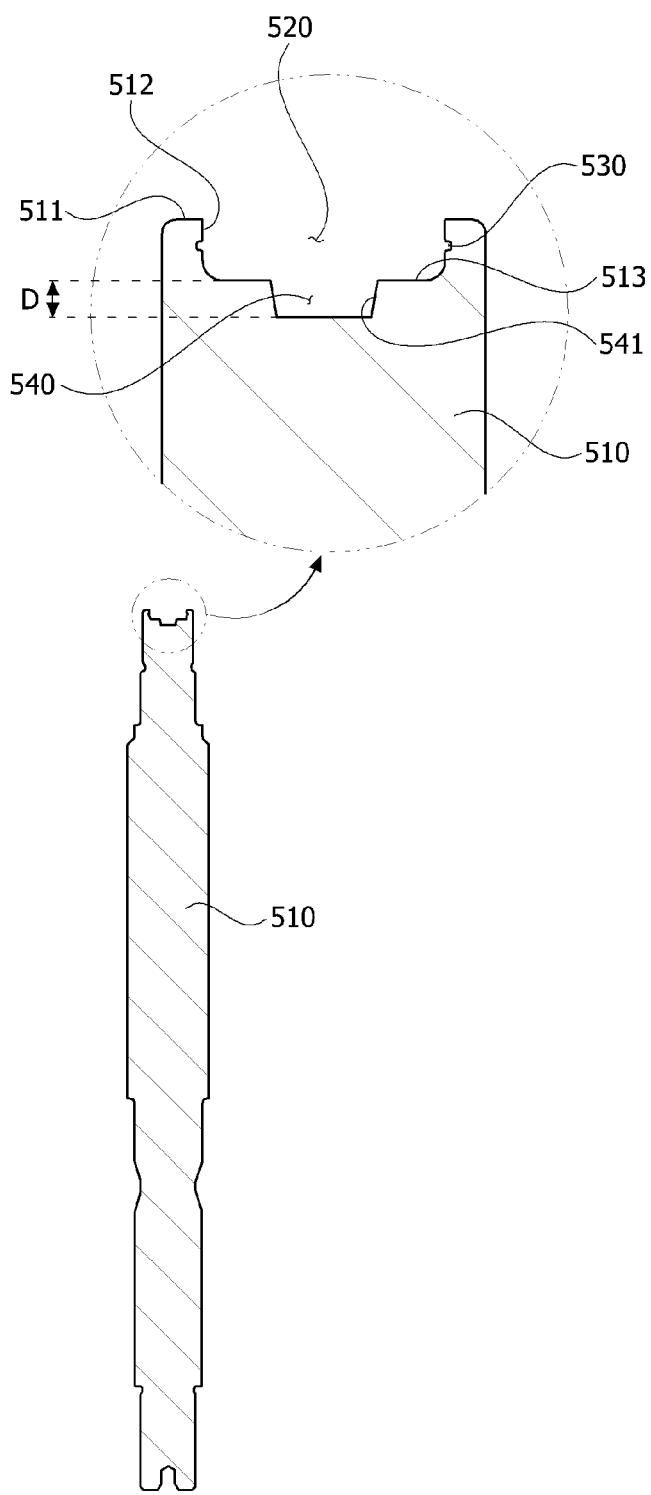
FIG. 5 is a cross-sectional view illustrating the shaft of the motor according to the first embodiment.

FIG. 4 is an exploded perspective view illustrating the sensing assembly disposed on the shaft of the motor according to the first embodiment, and FIG. 5 is a cross-sectional view illustrating the shaft of the motor according to the first embodiment.

Referring to FIGS. 4 and 5, the shaft 500 may include a shaft body 510 formed to have a cylindrical shape, a first groove 520 concavely formed in the shaft direction in an upper surface 511 of the shaft body 510, a second groove 530 concavely formed in the radius direction in an inner circumferential surface 512 of the shaft body 510 forming the first groove 520, and a third groove 540 concavely formed in the shaft direction in a lower surface 513 of the shaft body 510 forming the first groove 520.

The rotor 300 may be disposed outside the shaft body 510, and the shaft body 510 may also be rotated in conjunction with the rotation of the rotor 300. In this case, the bearings 10 may be disposed on an outer circumferential surface of the shaft body 510.

As illustrated in FIGS. 1 and 2, an upper end of the shaft body 510 may be externally exposed from the cover 200. For example, even in a state in which the cover 200 is disposed on the housing 100, the upper end of the shaft body 510 may be externally exposed. Accordingly, the sensing assembly may be coupled to the upper portion of the shaft 500 in a state in which the cover 200 is coupled to the housing 100.

The first groove 520 may be formed in the upper end of the shaft body 510. For example, the first groove 520 may be concavely formed downward in the upper surface 511 of the shaft body 510. Since the first groove 520 is formed, the inner circumferential surface 512 and the lower surface 513 may be formed on the shaft body 510.

The second groove 530 may be concavely formed outward in the inner circumferential surface 512 of the shaft body 510. As illustrated in FIG. 4, the second groove 530 may be formed in the inner circumferential surface 512 in the circumferential direction.

The third groove 540 may be concavely formed downward in the lower surface 513 of the shaft body 510. In this case, an inner diameter of the third groove 540 may be less than that of the first groove 520.

In addition, the elastic member 900 may be coupled to the third groove 540. In this case, a depth D of the third groove 540 may be less than a height H of the elastic member 900 in the shaft direction. Accordingly, the elastic member 900 may be disposed to protrude from the lower surface 513 of the shaft body 510. Accordingly, since the sensing magnet 800 is disposed to be spaced apart from the lower surface 513 of the shaft body 510 due to the elastic member 900 in the shaft direction, a magnetic flux is prevented from leaking from the sensing magnet 800 to the shaft 500 so that a sensing sensitivity can be improved.

In addition, the third groove 540 may prevent the elastic member 900 coupled to the third groove 540 from moving in the radius direction and guide coupling of the elastic member 900 such that the elastic member 900 is positioned at a predetermined position.

In this case, the third groove 540 may be formed to have a vertical cross section having a tapered shape so that an inclined surface 541 is formed. In this case, the inclined surface 541 may guide the coupling of the elastic member 900.

The bus bar 600 may be disposed on the stator 400.

In addition, the bus bar 600 may be electrically connected to the coils 430 of the stator 400.

The bus bar 600 may include a bus bar body (not shown) and a plurality of terminals (not shown) disposed in the bus bar body. In this case, the bus bar body may be a mold product formed through an injection molding process. In addition, the terminals may be electrically connected to the coils 430 of the stator 400.

The coupling member 700 may be coupled to the upper end portion of the shaft 500 to protect the sensing magnet 800 disposed in the coupling member 700. In this case, only a part of the coupling member 700 may be disposed in the first groove 520. In this case, the coupling member 700 may be formed to have a shape structure capable of applying an elastic force to the shaft 500. Accordingly, combinability and assemblability of the coupling member 700 to the shaft 500 can be secured.

Referring to FIGS. 3 and 4, the coupling member 700 may be inserted into the first groove 520 of the shaft 500. In addition, an end portion of the coupling member 700 may be coupled to the second groove 530 of the shaft 500. Accordingly, the coupling member 700 can be prevented from being separated from the shaft 500.

In this case, an outer diameter D1 of the coupling member 700 is less than an outer diameter D2 of the shaft 500. In addition, the coupling member 700 is inserted into and coupled to the upper portion of the shaft 500. Accordingly, when the motor 1 is installed in a target body (not shown) in which the motor 1 is used, coupling interference occurring between the motor 1 and the target body due to the coupling member 700 can be minimized.

Figure 6:
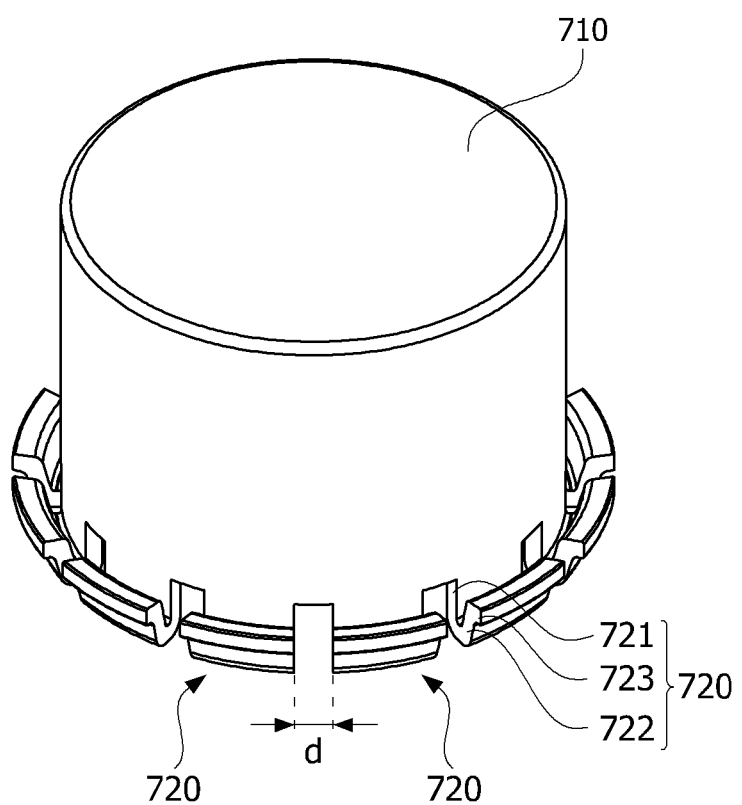
FIG. 6 is a perspective view illustrating a coupling member of the motor according to the first embodiment.
Figure 7:
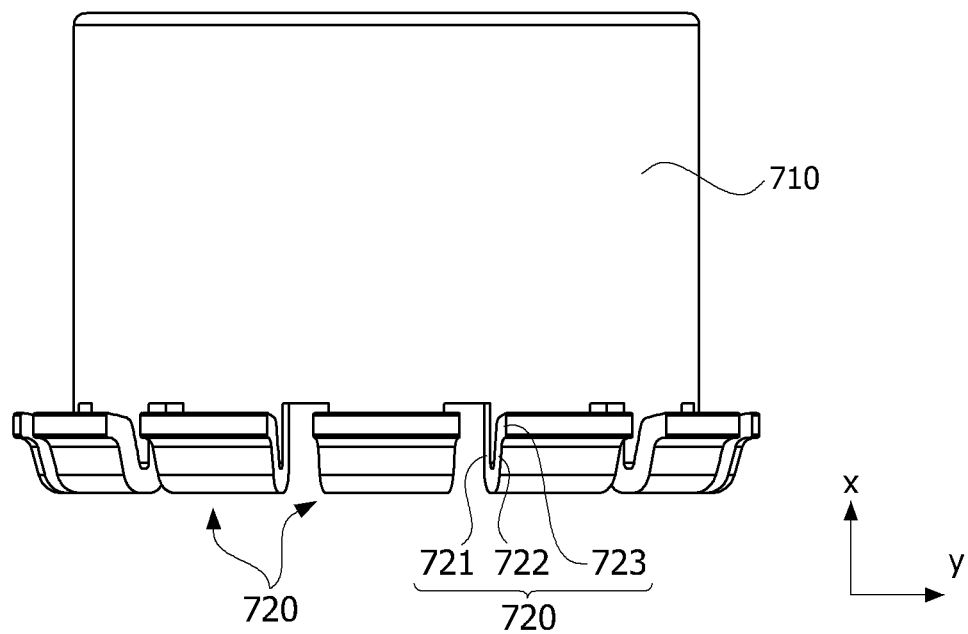
FIG. 7 is a side view illustrating the coupling member of the motor according to the first embodiment.
Figure 8:
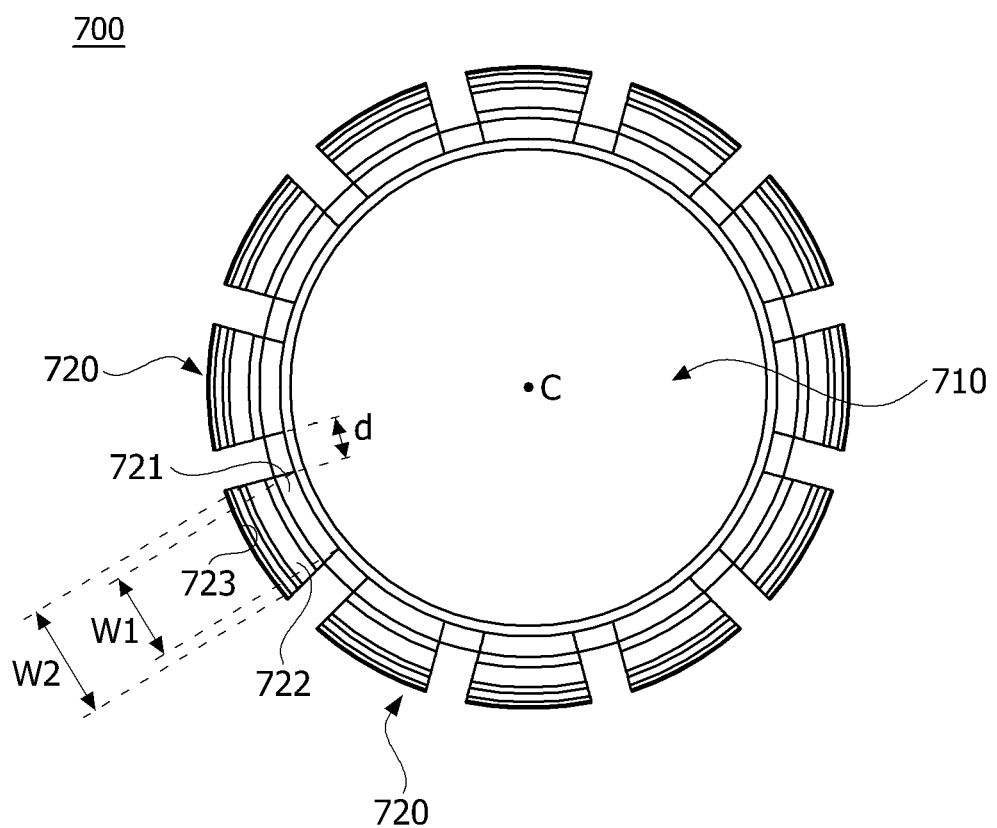
FIG. 8 is a bottom view illustrating the coupling member of the motor according to the first embodiment.
Figure 9:
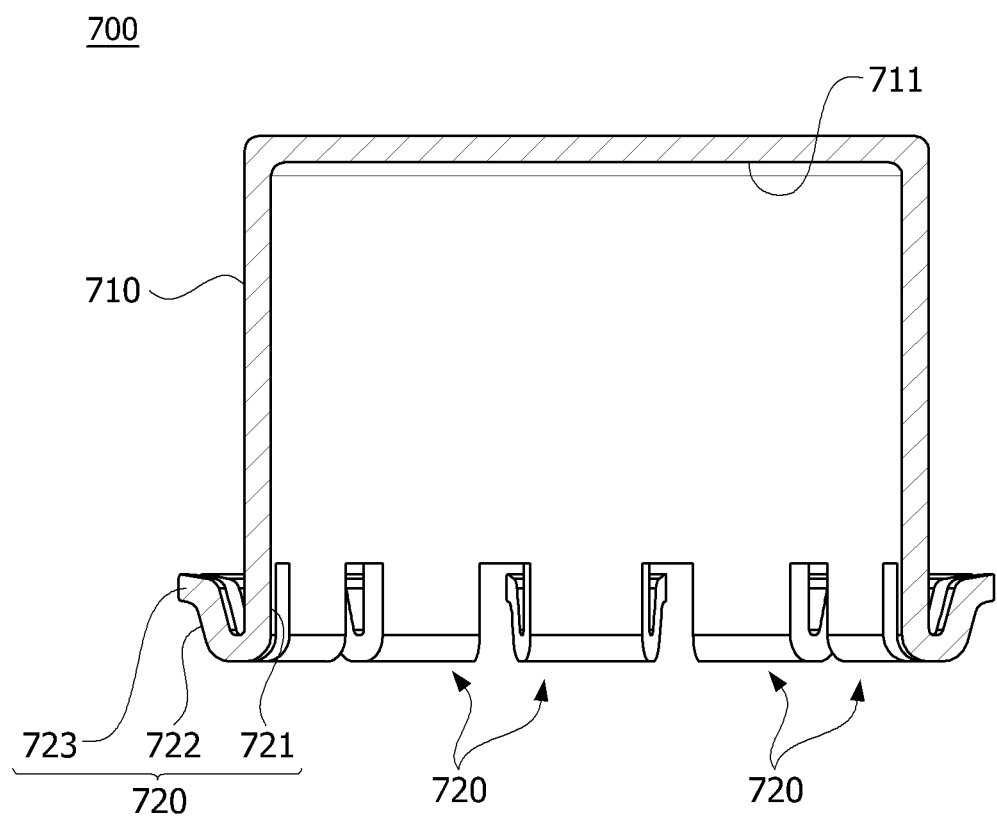
FIG. 9 is a cross-sectional view illustrating the coupling member of the motor according to the first embodiment.

FIG. 6 is a perspective view illustrating the coupling member of the motor according to the first embodiment, FIG. 7 is a side view illustrating the coupling member of the motor according to the first embodiment, FIG. 8 is a bottom view illustrating the coupling member of the motor according to the first embodiment, and FIG. 9 is a cross-sectional view illustrating the coupling member of the motor according to the first embodiment.

Referring to FIGS. 6 to 9, the coupling member 700 may include an accommodation portion 710 and a plurality of coupling portions 720 formed to protrude from an end portion of the accommodation portion 710. In this case, the coupling portion 720 may be formed to have a shape structure capable of applying an elastic force to the shaft 500. Accordingly, the coupling member 700 may be easily coupled to the first groove 520 of the shaft 500.

The accommodation portion 710 may be formed to have a cylindrical shape in which a space is formed. Accordingly, the sensing magnet 800 may be disposed in the space. In this case, the sensing magnet 800 may be disposed in the accommodation portion 710 using a fitting method.

The plurality of coupling portions 720 may be disposed on a lower end of the accommodation portion 710 to be spaced apart from each other by a separation distance d in a circumferential direction of the accommodation portion 710. For example, when the coupling member 700 is assembled, the plurality of coupling portions 720 disposed to be spaced apart from each other may maintain elasticity and reduce a force required for the assembly.

The coupling portion 720 may have a bent shape to have an elastic force.

The coupling portions 720 may include first regions 721 formed to protrude downward from a lower end portion of the accommodation portion 710, second regions 722 obliquely bent upward from lower portions of the first regions 721, and third regions 723 bent outward from end portions of the second regions 722.

The first regions 721 may be formed to protrude downward from the lower end portion of the accommodation portion 710. In this case, the plurality of first regions 721 may be disposed on the lower end of the accommodation portion 710 to be spaced apart from each other by the predetermined separation distance d in the circumferential direction of the accommodation portion 710.

The second regions 722 may be obliquely bent upward from the lower portions of the first regions 721. Accordingly, regions in which the first regions 721 meet the second regions 722 may include curved surfaces but are not necessarily limited thereto.

Accordingly, the coupling portion 720 has a shape structure capable of applying an elastic force to the shaft 500 due to the second regions 722. Accordingly, the coupling member 700 can be easily inserted into the first groove 520 of the shaft 500, and the coupling member 700 can be prevented from being separated upward from the shaft 500 due to the elastic force.

The third regions 723 may be formed outward from the end portions of the second regions 722. In addition, when the coupling member 700 is inserted into the first groove 520 of the shaft 500, the third regions 723 are coupled to the second groove 530 of the shaft 500. Accordingly, the separation of the coupling member 700 can be further prevented.

In addition, as the third regions 723 are coupled to the second groove 530, an arrangement position of the coupling member 700 is determined. That is, since the third regions 723 are coupled to the second groove 530, the coupling member 700 is positioned at a preset position on the shaft 500, and thus the position of the coupling member 700 is determined.

Meanwhile, the separation distance d may be less than a width W1 of the first region 721. In this case, the width W1 of the first region 721 may be 2.4 times the separation distance d.

In addition, the width W1 of the first region 721 may be less than a width W2 of the second region 722. That is, the width W2 of the second region 722 may be greater than the width W1 of the first region 721. In this case, the width W2 of the second region 722 may be 3 times the separation distance d.

In addition, a width of the third region 723 may be greater than the width W2 of the second region 722. Accordingly, the region in which the third region 723 is coupled to the second groove 530 is increased, and thus a coupling force of the coupling member 700 to the second groove 530 of the shaft 500 can be further increased.

Accordingly, the coupling member 700 may include the coupling portion 720 of which a width is increased outward. As illustrated in FIG. 8, the coupling portion 720 may be formed to have a trapezoid shape when viewed from below. Accordingly, a coupling force between the coupling portions 720 and the second groove 530 of the shaft 500 can be further increased.

Meanwhile, the coupling member 700 may be formed of a metal material. Accordingly, since a strength of the coupling member 700 is increased, the coupling member 700 may firmly withstand an external force applied from the outside to effectively protect the sensing magnet 800 disposed therein.

In this case, the coupling member 700 may be formed of a non-magnetic material among metal materials. Accordingly, even when the sensing magnet 800 is in contact with an interior of the coupling member 700, a magnetic flux is prevented from leaking from the sensing magnet 800 to the coupling member 700 so that a sensing sensitivity can be increased. Accordingly, even when the outer diameter D1 of the coupling member 700 is less than the outer diameter D2 of the shaft 500, the sensing magnet 800 can be miniaturized. Accordingly, an outer diameter D3 of the sensing magnet 800 may be less than the outer diameter D1 of the coupling member 700. For example, since the sensing magnet 800 is disposed in the accommodation portion 710 of the coupling member 700, the outer diameter D3 of the sensing magnet 800 is less than the outer diameter D1 of the accommodation portion 710 of the coupling member 700, and thus the sensing magnet 800 can be miniaturized.

In addition, the coupling member 700 may be formed of a synthetic resin material such as plastic which is a non-magnetic material. Accordingly, a degree of molding freedom of the coupling member 700 can be improved.

As the coupling member 700 is formed of the synthetic resin material, even when the sensing magnet 800 is in contact with the interior of the coupling member 700, the magnetic flux is prevented from leaking from the sensing magnet 800 to the coupling member 700 so that a sensing sensitivity can be increased.

The sensing magnet 800 can be disposed in the coupling member 700.

In addition, the sensing magnet 800 may be disposed to be spaced apart from the lower surface 513 of the shaft body 510 due to the elastic member 900 in the shaft direction. Accordingly, a magnetic flux can be prevented from leaking from the sensing magnet 800 to the shaft 500 so that a sensing sensitivity can be increased.

The sensing magnet 800 may be a two-pole magnet having one N pole and one S pole.

In addition, rotation of the sensing magnet 800 may be detected by a detector (not shown) disposed on the coupling member 700. In this case, the detector may include a printed circuit board (not shown) and a magnetic element (not shown). In addition, the magnetic element may be a Hall integrated circuit (IC) disposed to face the sensing magnet 800.

The elastic member 900 may be disposed under the sensing magnet 800. In this case, the elastic member 900 may be formed of any one of elastic materials such as rubber, plastic, or silicone which has an elastic force. Accordingly, the elastic member 900 blocks a magnetic leakage from the sensing magnet 800 to the shaft 500 to improve magnet characteristics of the sensing magnet 800 so that a sensing sensitivity can be increased.

In addition, the upper surface of the sensing magnet 800 may be pressed against the lower surface 711 of the accommodation portion 710 due to an elastic force of the elastic member 900. Accordingly, the sensing magnet 800 may be rotated with the coupling member 700.

The elastic member 900 may include an upper elastic member portion 910 and a lower elastic member portion 920. In this case, an upper surface 911 of the upper elastic member portion 910 may be pressed against and in contact with a lower portion of the sensing magnet 800 due to the elastic force.

The lower elastic member portion 920 may be formed to extend downward from the lower portion of the upper elastic member portion 910. In addition, the lower elastic member portion 920 is disposed in the third groove 540 of the shaft 500 to determine an arrangement position of the elastic member 900.

The lower elastic member portion 920 may be formed to have a vertical cross section having a tapered shape. Accordingly, the elastic member 900 may be guided by the inclined surface 541 forming the third groove 540 and positioned at a preset position.

Figure 10:
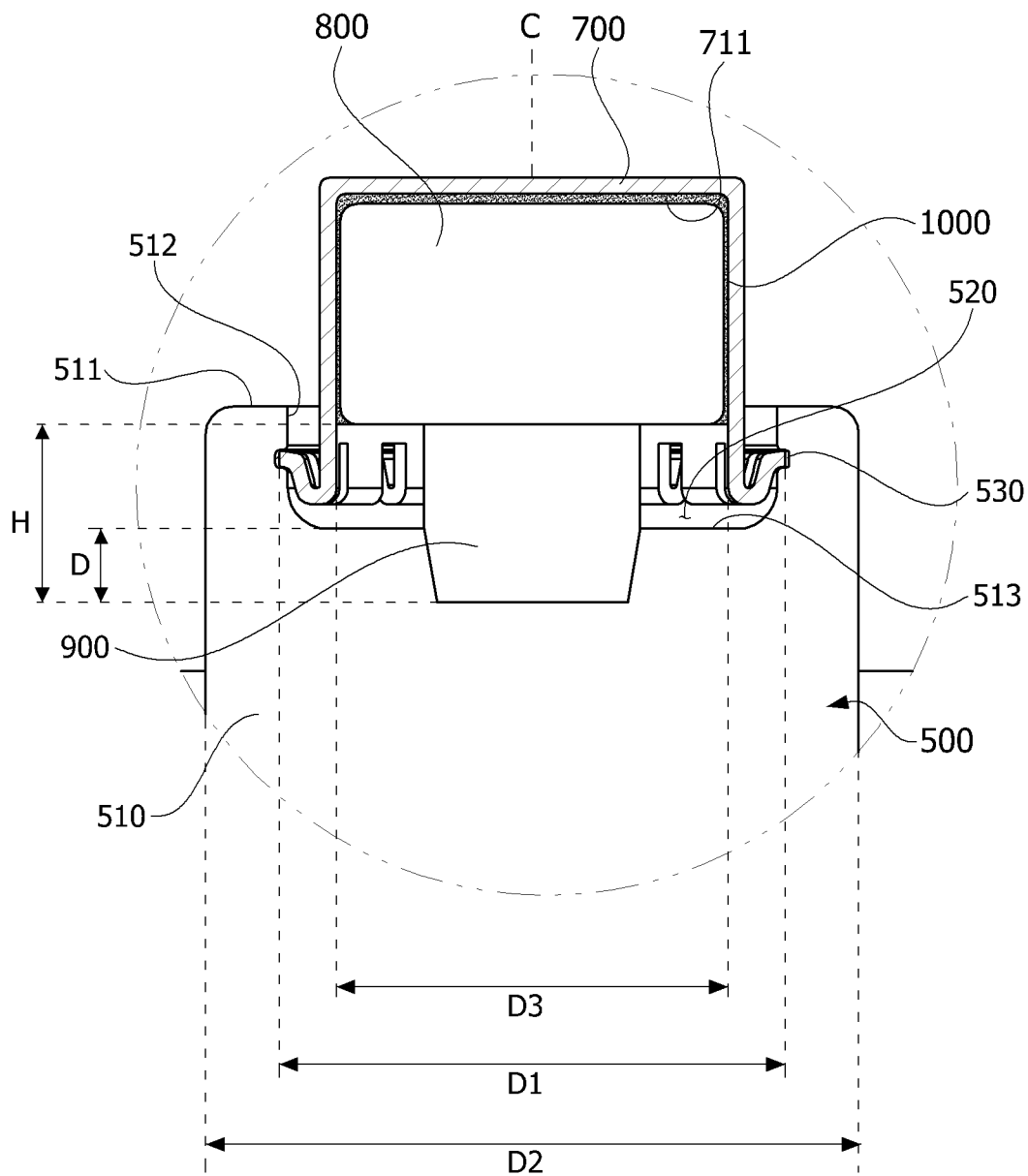
FIG. 10 is an enlarged view illustrating region A of FIG. 2 in which an adhesive member of the motor according to the first embodiment is disposed.

FIG. 10 is an enlarged view illustrating region A of FIG. 2 in which the adhesive member of the motor according to the first embodiment is disposed.

Referring to FIG. 10, the adhesive member 1000 may be disposed between the coupling member 700 and the sensing magnet 800. For example, the adhesive member 1000 is applied on an inner side of the coupling member 700 to fix the sensing magnet 800 to the coupling member 700. Accordingly, the sensing magnet 800 may be positioned at a preset position in the coupling member 700.

In addition, a fixing force and a rotating force of the sensing magnet 800 may be increased due to the elastic force of the elastic member 900 and the adhesive member 1000.

In the motor 1, a slip of the sensing magnet 800 rotated in conjunction with the rotation of the shaft 500 may be prevented due to pressing of the elastic member 900 against the sensing magnet 800 and a possibility of the slip occurrence may be completely prevented using the adhesive member 1000.

In addition, since the coupling member 700 and the sensing magnet 800 may form the sensing assembly using the adhesive member 1000, in a state in which the housing 100 is coupled to the cover 200, the sensing assembly may be disposed on an upper end of the shaft 500 so that assemblability can be improved. In this case, in a state in which the elastic member 900 is disposed in the third groove 540 of the shaft 500, the sensing assembly may be coupled to the shaft 500.

Meanwhile, a bond or the like which is a non-magnetic material may be used as the adhesive member 1000.

Accordingly, even when the coupling member 700 is formed of a metal material which is a magnetic material, a magnetic flux leaking from the sensing magnet 800 to the coupling member 700 is prevented by the adhesive member 1000 so that a sensing sensitivity can be increased.

Figure 11:
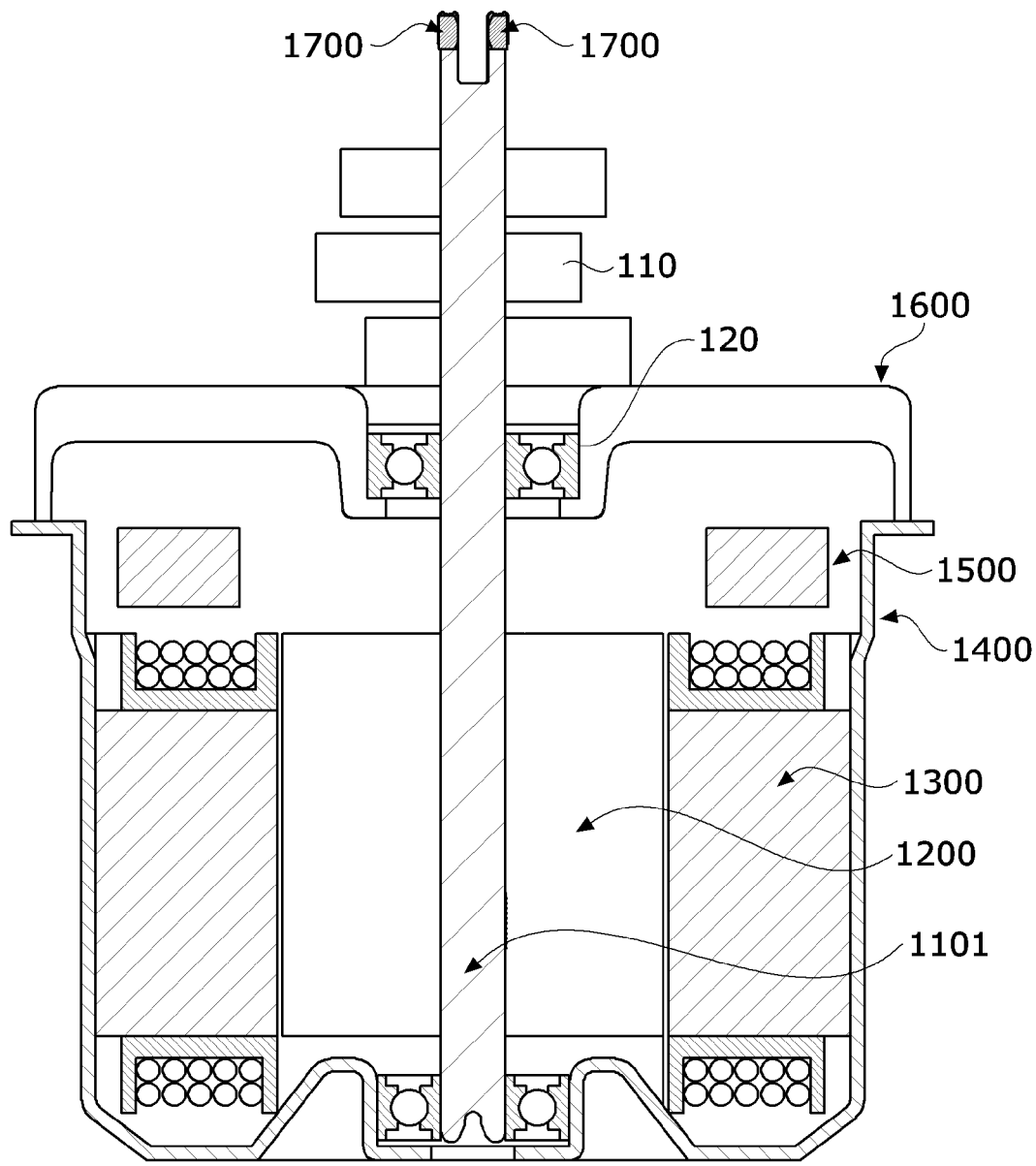
FIG. 11 is a side cross-sectional view illustrating a motor according to a second embodiment.

FIG. 11 is a side cross-sectional view illustrating a motor according to a second embodiment.

Figure 12:
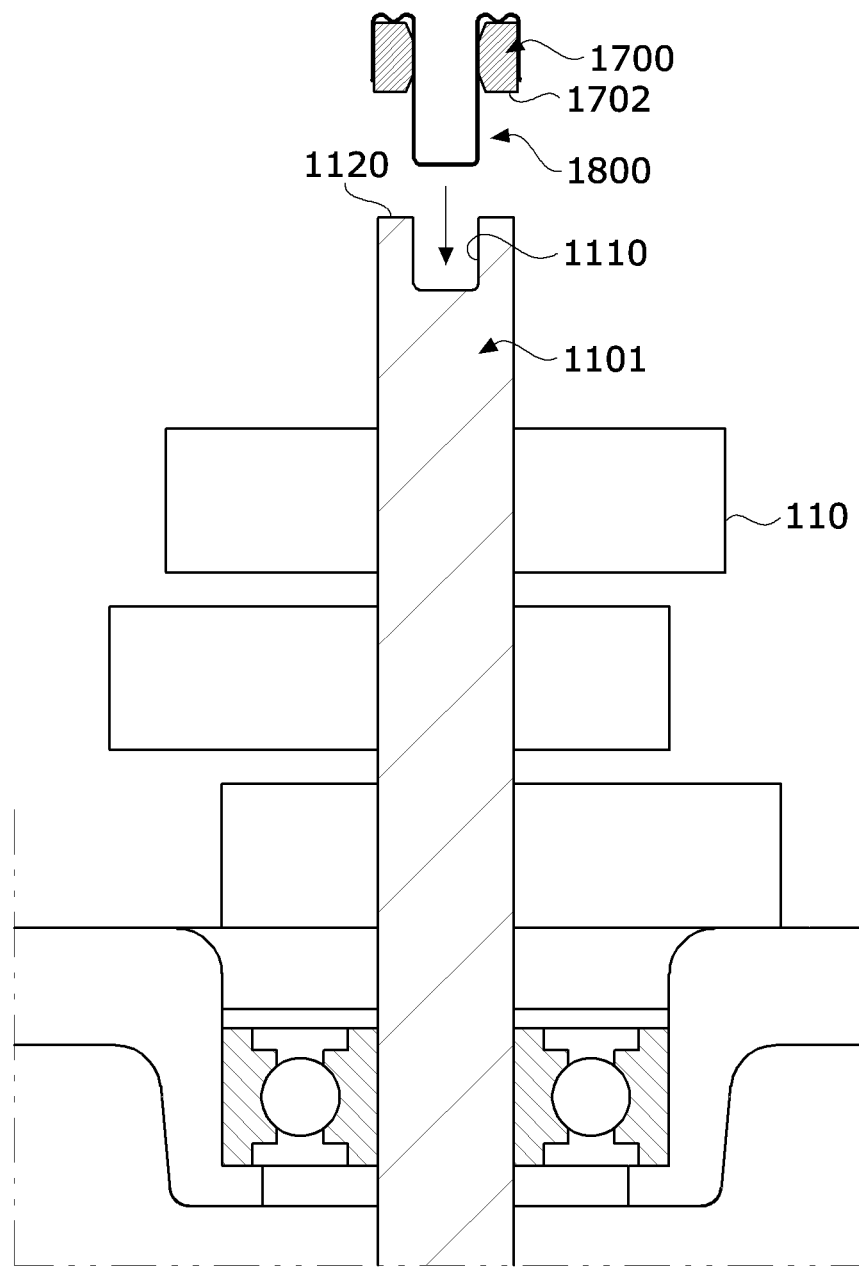
FIG. 12 is a view illustrating a coupling member which couples a shaft and a sensing magnet.

Referring to FIGS. 11 and 12, the motor according to the second embodiment may include a shaft 1101, a rotor 1200, a stator 1300, a housing 1400, and a bus bar 1500.

The shaft 1101 may be coupled to the rotor 1200. When a current is supplied and an electromagnetic interaction occurs between the rotor 1200 and the stator 1300, the rotor 1200 is rotated. In addition, the shaft 1101 is rotated in conjunction with the rotation of the rotor 1200. The shaft 1101 may be connected to a steering shaft of a vehicle to transmit power to the steering shaft. A plurality of bearings 110 may be coupled to the shaft 1101. The bearings 110 may be eccentrically disposed about the shaft 1101 in a shaft direction.

The rotor 1200 is rotated due to an electrical interaction with the stator 1300.

The rotor 1200 may include a rotor core and magnets. A plurality of circular thin steel plates may be stacked to be provided as the rotor core, or the rotor core may have one cylindrical shape. A hole may be disposed at a center of the rotor core. The hole is coupled to the shaft 1101. A protrusion which guides the magnets may protrude from an outer circumferential surface of the rotor core. The magnets may be attached to the outer circumferential surface of the rotor core. The plurality of magnets may be disposed at predetermined intervals along a circumference of the rotor core. The rotor 1200 may include a can member. The can member surrounds the magnets to prevent the magnets from being separated from the rotor core and from being exposed.

The stator 1300 may include coils. The coils electrically interact with the magnets of the rotor 1200. A specific structure of the stator 1300 around which the coils 1310 are wound will be described below. The stator 1300 may include a stator core including a plurality of teeth. The stator core includes a yoke and the teeth. The yoke has an annual shape. Teeth protrude from the yoke toward a center thereof. The teeth may be disposed at predetermined intervals along the yoke. The coils are wound around the teeth. Meanwhile, a plurality of thin steel plates may be stacked to be formed as the stator core. In addition, a plurality of divided cores may be coupled or connected to each other to be formed as the stator core.

The rotor 1200 and the stator 1300 may be accommodated in the housing 1400.

The bus bar 1500 may be disposed on the stator 1300. The bus bar 1500 may include terminals in a body having an annual shape. In addition, the terminals of the bus bar 1500 may include phase terminals connected to U-phase, V-phase, and W-phase power sources and a neutral terminal electrically connecting the phase terminals.

A bracket 1600 covers an open upper portion of the housing 1400. A bearing 120 may be disposed at a center of the bracket 1600. The bearing 120 rotatably supports the shaft 1101.

A sensing magnet 1700 is coupled to an upper end of the shaft 1101. When the shaft 1101 is rotated, the sensing magnet 1700 is also rotated in conjunction with the rotation of the shaft 1101. A sensor disposed in an application in which the motor is installed may detect a change in magnetic flux generated due to the rotation of the sensing magnet 1700.

FIG. 12 is a view illustrating a coupling member which couples the shaft and the sensing magnet.

Referring to FIG. 12, a first groove 1110 is disposed in the upper end of the shaft 1101. The first groove 1110 has a shape concavely recessed in the upper end of the shaft 1101. A coupling member 1800 is coupled to the sensing magnet 1700. In addition, the coupling member 1800 is coupled to the shaft 1101 through the first groove 1110.

Figure 13:
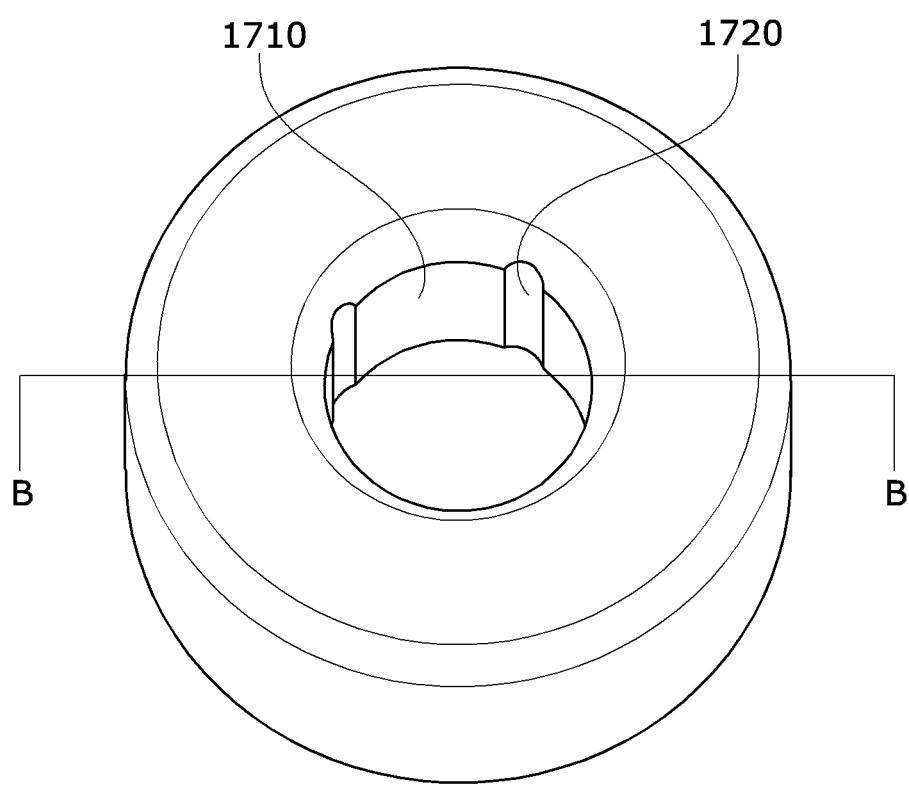
FIG. 13 is a perspective view illustrating the sensing magnet.
Figure 14:
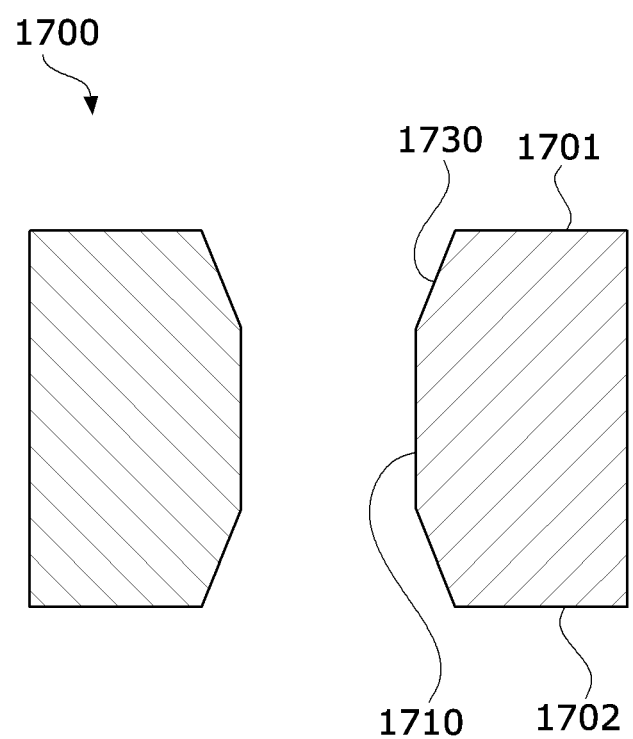
FIG. 14 is a side cross-sectional view taken along line B-B of FIG. 13.

FIG. 13 is a perspective view illustrating the sensing magnet, and FIG. 14 is a side cross-sectional view taken along line A-A of FIG. 13.

Referring to FIGS. 13 and 14, the sensing magnet 1700 has an annual shape. The sensing magnet 1700 includes a through hole 1710. The through hole 1710 is disposed in a central portion of the sensing magnet 1700. The coupling member 1800 is in contact with an inner wall of the through hole 1710. Second grooves 1720 are disposed along the inner wall of the through hole 1710. The second grooves 1720 of the sensing magnet 1700 may be formed to extend downward from an upper side of the sensing magnet 1700.

The plurality of second grooves 1720 may be disposed. The second grooves 1720 prevent a slip occurring between the sensing magnet 1700 and the coupling member 1800.

The sensing magnet 1700 may include inclined surfaces 1730 around the through hole 1710. The inclined surface 1730 may be disposed at a boundary between an upper surface 1701 of the sensing magnet 1700 and the through hole 1710. In addition, the inclined surface 1730 may be disposed at a boundary between a lower surface 1702 of the sensing magnet 1700 and the through hole 1710. The inclined surfaces 1730 guide the coupling member 1800 to be easily inserted into the through hole 1710.

Figure 15:
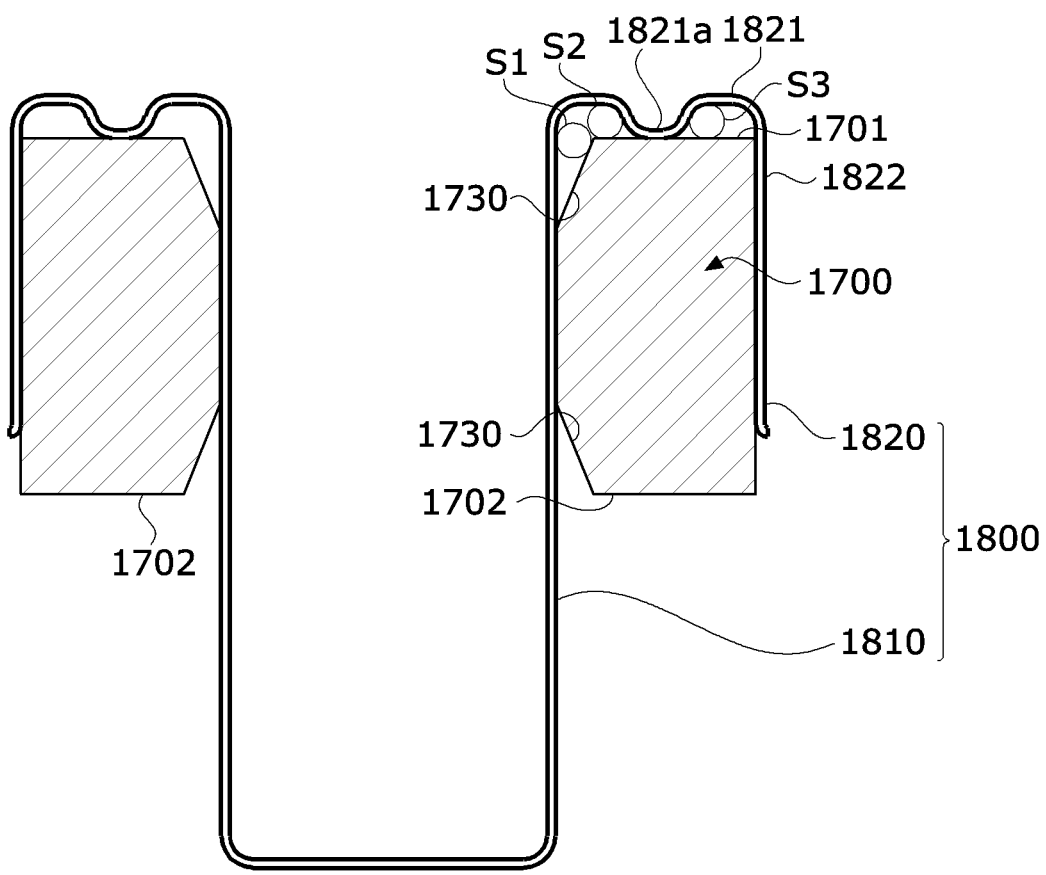
FIG. 15 is a view illustrating the coupling member.

FIG. 15 is a view illustrating the coupling member.

Referring to FIGS. 12 and 15, the coupling member 1800 couples the sensing magnet 1700 to the shaft 1101. The coupling member 1800 may include a first body 1810 and a second body 1820. The first body 1810 and the second body 1820 may be divided and described according to a shape and a functional characteristic but may be one can member in which the first body 1810 and the second body 1820 are vertically connected.

The first body 1810 may be a hollow cylindrical can member. The first body 1810 is press-fitted into the through hole 1710 of the sensing magnet 1700. An outer diameter of the first body 1810 may correspond to a diameter of the through hole 1710. The first body 1810 is press-fitted into the through hole 1710 such that a lower end of the first body 1810 is positioned at a lower level than a lower surface of the sensing magnet 1700. The lower end of the first body 1810 may be insertion-coupled to the first groove 1110 of the shaft 1101. When the first body 1810 is insertion-coupled to the first groove 1110, the lower surface 1702 of the sensing magnet 1700 is in contact with an upper end 1120 of the shaft 1101.

An adhesive may be applied between an outer circumferential surface of the first body 1810 and an inner wall of the through hole 1710. In this case, an empty space like S1 of FIG. 15 is formed between the sensing magnet 1700 and the first body 1810 due to the inclined surface 1730 of the sensing magnet 1700.

The second body 1820 is disposed to horizontally extend from an upper end of the first body 1810. The second body 1820 forms an accommodation space for accommodating the sensing magnet 1700. The second body 1820 may include an upper surface portion 1821 and a side surface portion 1822. The upper surface portion 1821 extends from the upper end of the first body 1810 to be bent laterally. The side surface portion 1822 extends from the upper surface portion 1821 to be bent downward. Accordingly, a space is formed between the first body 1810 and the side surface portion 1822. The sensing magnet 1700 is accommodated in the space. The first body 1810 and the second body 1820 have a clip shape and an elastic force. The first body 1810 and the second body 1820 press the sensing magnet 1700 to increase a fixing force applied to the sensing magnet 1700.

At least a part of the upper surface portion 1821 is in contact with an upper surface of the sensing magnet 1700. For example, a contact portion 1821a protruding downward to be in contact with the upper surface of the sensing magnet 1700 may be disposed on the upper surface portion 1821. A region of the upper surface portion 1821 excluding the contact portion 1821a is positioned to be spaced apart from the upper surface 1701 of the sensing magnet 1700. Accordingly, a separating space like S2 of FIG. 15 is formed inside the contact portion 1821a, and a separating space like S3 of FIG. 15 is formed outside the contact portion 1821a. The separating spaces S1, S2, and S3 improve assemblability of the sensing magnet 1700 and the coupling member 1800. In addition, the separating spaces S1, S2, and S3 may be used as an accommodation space for accommodating a leaked adhesive. The side surface portion 1822 is in contact with an outer circumferential surface of the sensing magnet 1700. An adhesive may be applied between the side surface portion 1822 and the outer circumferential surface of the sensing magnet 1700. A lower end of the side surface portion 1822 may be disposed at a higher level than a lower end of the sensing magnet 1700. This is because, when the first body 1810 is insertion-coupled to the first groove 1110, the lower end of the side surface portion 1822 is not to be in contact with the upper end 1120 of the shaft 1101.

In a state in which the sensing magnet 1700 and the coupling member 1800 are bound, the lower end of the first body 1810 protrudes from the lower end of the sensing magnet 1700. Since a lower portion of the first body 1810 protruding from the lower end of the sensing magnet 1700 is coupled to the first groove 1110 of the shaft 1101, the sensing magnet 1700 can be coupled to the shaft 1101 without an additional process.

Figure 16:
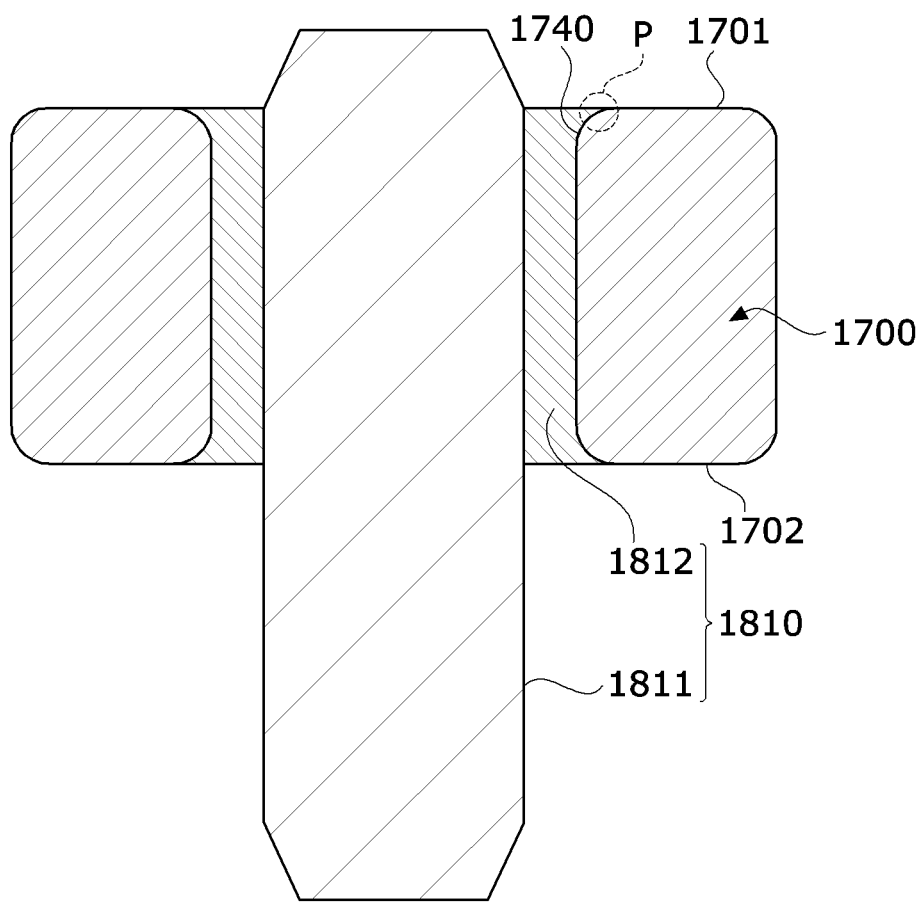
FIG. 16 is a view illustrating a modified example of the coupling member.

FIG. 16 is a view illustrating a modified example of the coupling member.

Referring to FIG. 16, a first body 1810 of a modified example of the coupling member 1800 may include a pin member 1811 and a mold member 1812. The pin member 1811 is a cylindrical member. In addition, an outer diameter of the pin member 1811 is less than a diameter of a through hole 1710. In addition, the pin member 1811 passes through the through hole 1710. A lower end of the pin member 1811 is disposed lower than a lower surface 1702 of a sensing magnet 1700.

The mold member 1812 is disposed between the pin member 1811 and the sensing magnet 1700. The mold member 1812 may be formed by an injection molding process in a state in which the pin member 1811 passes through the through hole 1710. A position of an upper end of the mold member 1812 corresponds to a position of an upper surface 1701 of the sensing magnet 1700. In addition, a position of a lower end of the mold member 1812 corresponds to the lower surface 1702 of the sensing magnet 1700.

The sensing magnet 1700 may include curved surfaces 1740 around the through hole 1710. The curved surface 1740 may be disposed at a boundary between the upper surface 1701 of the sensing magnet 1700 and the through hole 1710. In addition, the curved surface 1740 may be disposed at a boundary between the lower surface 1702 of the sensing magnet 1700 and the through hole 1710. When the injection molding process is performed, the mold member 1812 fills the through hole 1710 to the curved surface 1740. Accordingly, a separating space is not generated between the sensing magnet 1700 and the coupling member 1800. Meanwhile, a protruding region like P of FIG. 16 of the mold member 1812 adjacent to the curved surface 1740 has resistance against a load applied to the pin member 1811 in a longitudinal direction. Accordingly, there is an advantage of increasing a coupling force of the sensing magnet 1700 and the mold member 1812.

The mold member 1812 binds the sensing magnet 1700 and the pin member 1811. In a state in which the sensing magnet 1700 and the coupling member 1800 are bound, the lower end of the pin member 1811 protrudes from a lower end of the sensing magnet 1700. Since a lower portion of the pin member 1811 protruding from the lower end of the sensing magnet 1700 is coupled to a first groove 1110 of the shaft 1101, the sensing magnet 1700 can be coupled to the shaft 1101 without an additional process.

Figure 17:
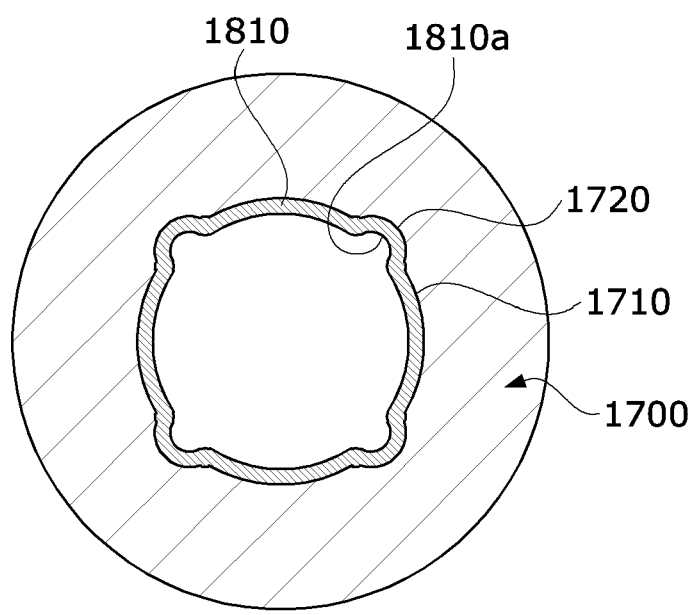
FIG. 17 is a view illustrating a state in which a coupling portion for preventing a slip and the sensing magnet are coupled.

FIG. 17 is a view illustrating a state in which the coupling portion for preventing a slip and the sensing magnet are coupled.

Referring to FIG. 17, first coupling portions 1810*a* are formed on the outer circumferential surface of the first body 1810 of the coupling member 1800. The first coupling portions 1810*a* are insertion-coupled to the second grooves 1720 of the sensing magnet 1700 to serve to prevent a slip phenomenon occurring between the sensing magnet 1700 and the coupling member 1800 in a rotational direction of the sensing magnet 1700.

Figure 18:
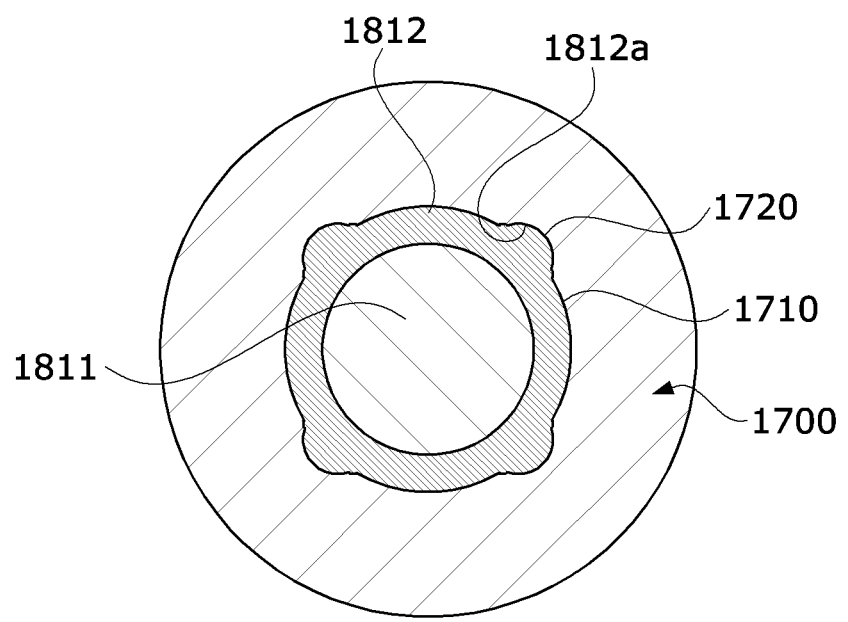
FIG. 18 is a view illustrating a state in which the modified example of the coupling member for preventing a slip and the sensing magnet are coupled.

FIG. 18 is a view illustrating a state in which a modified example of the coupling member for preventing a slip and the sensing magnet are coupled.

Referring to FIG. 18, second coupling portions 1812*a* are formed on an outer circumferential surface of the mold member 1812 of a modified example of the coupling member 1800. The second coupling portions 1812*a* are insertion-coupled to second grooves 1720 of a sensing magnet 1700 to serve to prevent a slip phenomenon occurring between the sensing magnet 1700 and the coupling member 1800 in a rotational direction of the sensing magnet 1700.

While the present invention has been shown and described with reference to the exemplary embodiments thereof, it will be understood by those skilled in the art that various changes in form and details may be made therein without departing from the spirit and scope of the invention as defined by the appended claims. In addition, it should be understood that differences related to modifications and changes fall within the scope of the present invention defined by the appended claims.

The invention claimed is:

1. A motor comprising:
a shaft including an end in which a first groove is concavely formed in a shaft direction;
a rotor and a sensing magnet which are coupled to the shaft;
a coupling member which couples the shaft and the sensing magnet; and
an elastic member disposed under the sensing magnet,
wherein the coupling member includes a coupling portion, which has an elastic force and of which at least a part is inserted into and coupled to the first groove, and an accommodation portion fixing the sensing magnet,
wherein the shaft includes a third groove concavely formed in the shaft direction of a lower surface of the first groove, and one lower region of the elastic member is disposed in the third groove.

2. The motor of claim 1, wherein:
a plurality of coupling portions are formed as the coupling portion of the coupling member on a lower end of the accommodation portion; and
each of the plurality of coupling portions includes a first region formed to protrude downward from an end portion of the accommodation portion and a second region obliquely bent upward from a lower portion of the first region.

3. The motor of claim 2, wherein:
the coupling portion further includes a third region bent outward from an end portion of the second region;
the shaft includes an inner circumferential surface and a lower surface which form the first groove;
the shaft includes a second groove concavely formed in the inner circumferential surface; and
an end portion of the third region is disposed in the second groove.

4. The motor of claim 1, wherein:
the coupling portion is press-fitted into and coupled to the first groove; and
the accommodation portion is disposed on a side surface of the coupling portion.

5. The motor of claim 4, wherein:
the coupling member includes a body having a cylindrical shape;
the accommodation portion includes an upper surface portion extending from an upper end of the body in a radius direction and a side surface portion extending downward from an edge of the upper surface portion;
the sensing magnet is formed to have a donut shape and includes a groove; and
a part of the body is disposed in the groove of the sensing magnet.

6. The motor of claim 5, wherein:
an outer circumferential surface of the body is in contact with an inner circumferential surface of the sensing magnet;
an inner surface of the upper surface portion is in contact with an upper surface of the sensing magnet; and
an inner surface of the side surface portion is in contact with an outer circumferential surface of the sensing magnet.

7. The motor of claim 6, wherein:
the upper surface portion includes a plurality of bent portions;
a height of the upper surface portion disposed between the bent portions is less than a height of the upper surface portion disposed outside the bent portion; and
the upper surface portion in contact with the upper surface of the sensing magnet is formed between the bent portions.

8. The motor of claim 7, wherein the upper surface portion disposed outside the bent portion is spaced apart from the upper surface of the sensing magnet so that an additional space is formed.

9. The motor of claim 4, wherein:
the sensing magnet includes inclined surfaces; and
the inclined surfaces are disposed on a boundary between an upper surface and an inner circumferential surface of the sensing magnet and disposed on a boundary between a lower surface and the inner circumferential surface of the sensing magnet.

10. A motor comprising:
a shaft including an end in which a first groove is formed;
a rotor and a sensing magnet which are coupled to the shaft;
a coupling member which couples the shaft and the sensing magnet; and
an elastic member disposed under the sensing magnet,
wherein the coupling member includes a coupling portion, which has an elastic force and of which at least a part is inserted into and coupled to the first groove, and an accommodation portion fixing the sensing magnet,
wherein the shaft includes a third groove concavely formed in a lower surface and one lower region of the elastic member is disposed in the third groove,
wherein a plurality of coupling portions are formed as the coupling portion of the coupling member on a lower end of the accommodation portion; and
each of the plurality of coupling portions includes a first region formed to protrude downward from an end portion of the accommodation portion and a second region obliquely bent upward from a lower portion of the first region.

11. The motor of claim 10, wherein:
the coupling portion further includes a third region bent outward from an end portion of the second region;
the shaft includes an inner circumferential surface and a lower surface which form the first groove;
the shaft includes a second groove concavely formed in the inner circumferential surface; and
an end portion of the third region is disposed in the second groove.

12. A motor comprising:
a shaft including an end in which a first groove is formed;
a rotor and a sensing magnet which are coupled to the shaft;
a coupling member which couples the shaft and the sensing magnet; and
an elastic member disposed under the sensing magnet,
wherein the coupling member includes a coupling portion, which has an elastic force and of which at least a part is inserted into and coupled to the first groove, and an accommodation portion fixing the sensing magnet,
wherein the shaft includes a third groove concavely formed in a lower surface and one lower region of the elastic member is disposed in the third groove,
wherein:
the coupling portion is press-fitted into and coupled to the first groove; and
the accommodation portion is disposed on a side surface of the coupling portion,
the coupling member includes a body having a cylindrical shape;
the accommodation portion includes an upper surface portion extending from an upper end of the body in a radius direction and a side surface portion extending downward from an edge of the upper surface portion;
the sensing magnet is formed to have a donut shape and includes a groove; and
a part of the body is disposed in the groove of the sensing magnet.

13. The motor of claim 12, wherein:
an outer circumferential surface of the body is in contact with an inner circumferential surface of the sensing magnet;
an inner surface of the upper surface portion is in contact with an upper surface of the sensing magnet; and
an inner surface of the side surface portion is in contact with an outer circumferential surface of the sensing magnet.

14. The motor of claim 13, wherein:
the upper surface portion includes a plurality of bent portions;
a height of the upper surface portion disposed between the bent portions is less than a height of the upper surface portion disposed outside the bent portion; and
the upper surface portion in contact with the upper surface of the sensing magnet is formed between the bent portions.

15. The motor of claim 14, wherein the upper surface portion disposed outside the bent portion is spaced apart from the upper surface of the sensing magnet so that an additional space is formed.

16. The motor of claim 12, wherein:
the sensing magnet includes inclined surfaces; and
the inclined surfaces are disposed on a boundary between an upper surface and an inner circumferential surface of the sensing magnet and disposed on a boundary between a lower surface and the inner circumferential surface of the sensing magnet.

* * * * *